(12) United States Patent
Wu et al.

(10) Patent No.: US 6,690,191 B2
(45) Date of Patent: Feb. 10, 2004

(54) BI-DIRECTIONAL OUTPUT BUFFER (75) Inventors: Chung-Hsiao R. Wu, Sunnyvale, CA (US); Jyh-Ming Jong, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/027,544

(22) Filed: Dec. 21, 2001

(65) Prior Publication Data

US 2003/0117172 A1 Jun. 26, 2003

(51) Int. Cl.[7] .......................................... H03K 19/0185
(52) U.S. Cl. .............................. 326/30; 326/86; 326/83; 326/90; 326/58; 327/108
(58) Field of Search .............................. 326/83, 86, 87, 326/90, 30, 56–58; 327/108; 710/100, 126

(56) References Cited

U.S. PATENT DOCUMENTS

| 5,371,424 A | * | 12/1994 | Quigley et al. ................ 326/63 |
| 5,498,990 A | * | 3/1996 | Leung et al. ................. 327/323 |
| 5,532,621 A | | 7/1996 | Kobayashi et al. |
| 5,652,528 A | * | 7/1997 | Kimura et al. ................. 326/83 |
| 5,929,657 A | | 7/1999 | Choi |
| 6,054,881 A | * | 4/2000 | Stoenner ...................... 327/112 |
| 6,127,849 A | | 10/2000 | Walker |

OTHER PUBLICATIONS

"SSTL for DIMM Applications"; Texas Instruments; Dec. 1997.
"EIA/JEDEC Standard", Stub Series Terminated Logic for 3.3 Volts (SSTL_3), EIA/JESD8–8; Electronic Industries Association, Engineering Department; Aug. 1996.

* cited by examiner

Primary Examiner—Vibol Tan
(74) Attorney, Agent, or Firm—Meyertons Hood Kivlin Kowert & Goetzel, P.C.; Rory D. Rankin (57) ABSTRACT A bi-directional output buffer includes active termination and separate driving and receiving impedances. The buffer has at least a driving mode and a receiving mode. In driving mode, the output impedance of the buffer is calibrated to a specified strength. In receiving mode, the buffer is calibrated to another specified impedance as an active termination. In addition, the buffer may be configured such that resistive components are shared in driving and receiving modes.

17 Claims, 9 Drawing Sheets

| Mode 401 | Enable 562 | Hi_z 560 | Data Out 226 | Ru1 302 | Ru2 306 | Rd1 304 | Rd2 308 | Output 230 |
|---|---|---|---|---|---|---|---|---|
| Hi Z | X | 1 | X | Off | Off | Off | Off | Hi Z |
| TX | 1 | 0 | 0 | Off | Off | On | On | 0 |
| TX | 1 | 0 | 1 | On | On | Off | Off | 1 |
| RX/Term | 0 | 0 | X | On | Off | On | Off | - |

BI-DIRECTIONAL OUTPUT BUFFER

BACKGROUND OF THE INVENTION

1. Field of the Invention

This invention relates to digital communication systems, and more particularly to I/O devices.

2. Description of the Relevant Art

One issue that is typically considered when designing electrical communication systems is that of ringing, or reflections, on transmission lines. Various termination techniques are often utilized in order to reduce the ringing, and the resultant signal distortion, that may occur on a transmission line. For example, one or more electrically resistive elements (e.g., resistors) may be inserted between a driver and an end of a transmission line in order to cause the effective output impedance of the driver to more closely match the characteristic impedance of the transmission line. Similarly, one or more electrically resistive elements may be coupled to an end of a transmission line at a receiver in order to cause the effective input impedance of the receiver to more closely match the characteristic impedance of the transmission line.

Figure 1A:
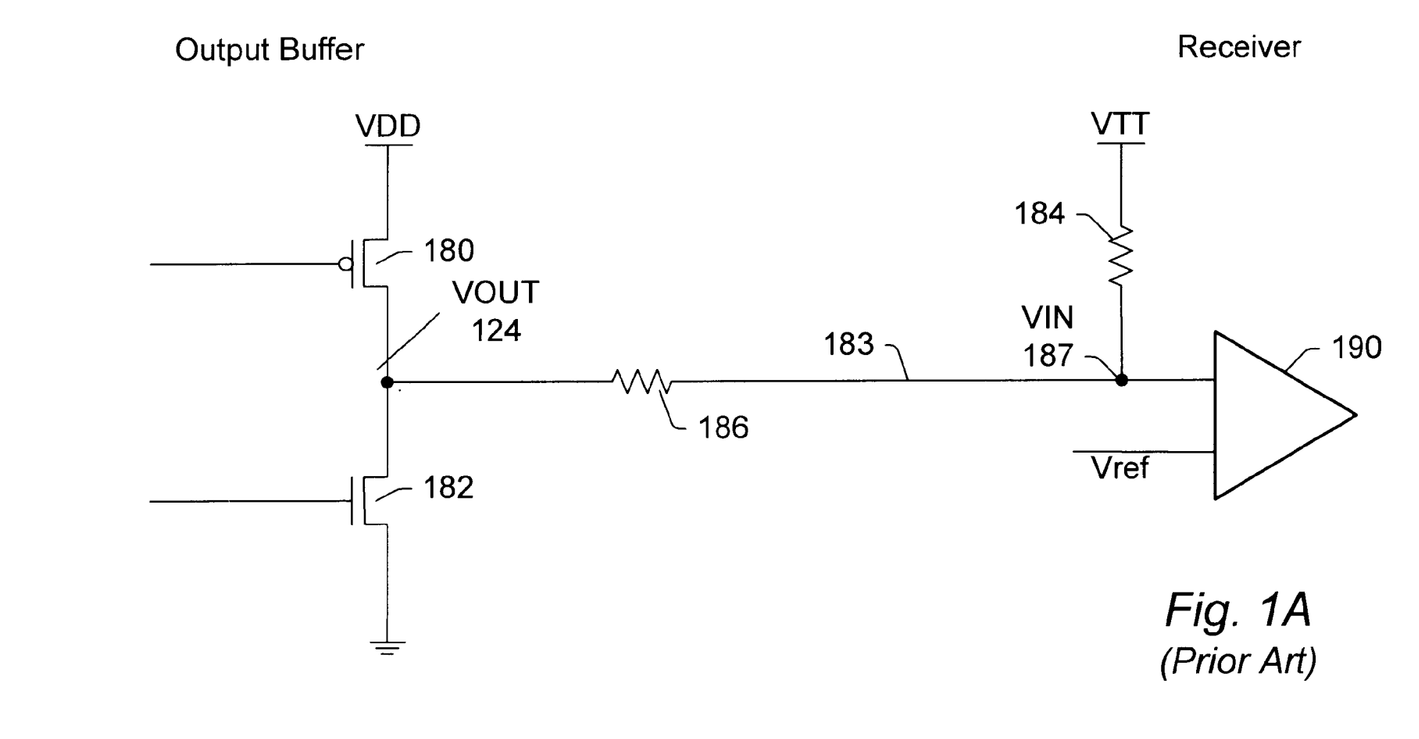
FIG. 1A illustrates a prior art output buffer.

FIG. 1A illustrates one example of a driver and receiver which utilize termination. In the example shown, an output buffer (driver) includes transistors 180 and 182 configured to drive an output signal 124. A receiver includes a comparator 190 coupled to receive an input voltage 186 and reference voltage Vref. A series resistor 186 has been added to the transmission line 183 in order to reduce signal reflections and distortion within the transmission line. Series resistor 186 may, for example, have a value equal to the characteristic impedance of the transmission line. A second termination resistor 184, also having a value equal to the characteristic impedance of transmission line 183, is connected between the first input terminal of op amp 190 and power supply voltage level VTT.

While both ends termination as illustrated in FIG. 1A reduces signal reflections, it also results in half amplitude received signals. When first termination resistor 186 and second termination resistor 184 are coupled to opposite ends of transmission line 183 in order to reduce signal reflections and distortion, they form a voltage divider network which restricts the range of voltage levels which may be used to convey signals from the driver to the receiver. Consequently, a more sensitive receiver is required.

Figure 1B:
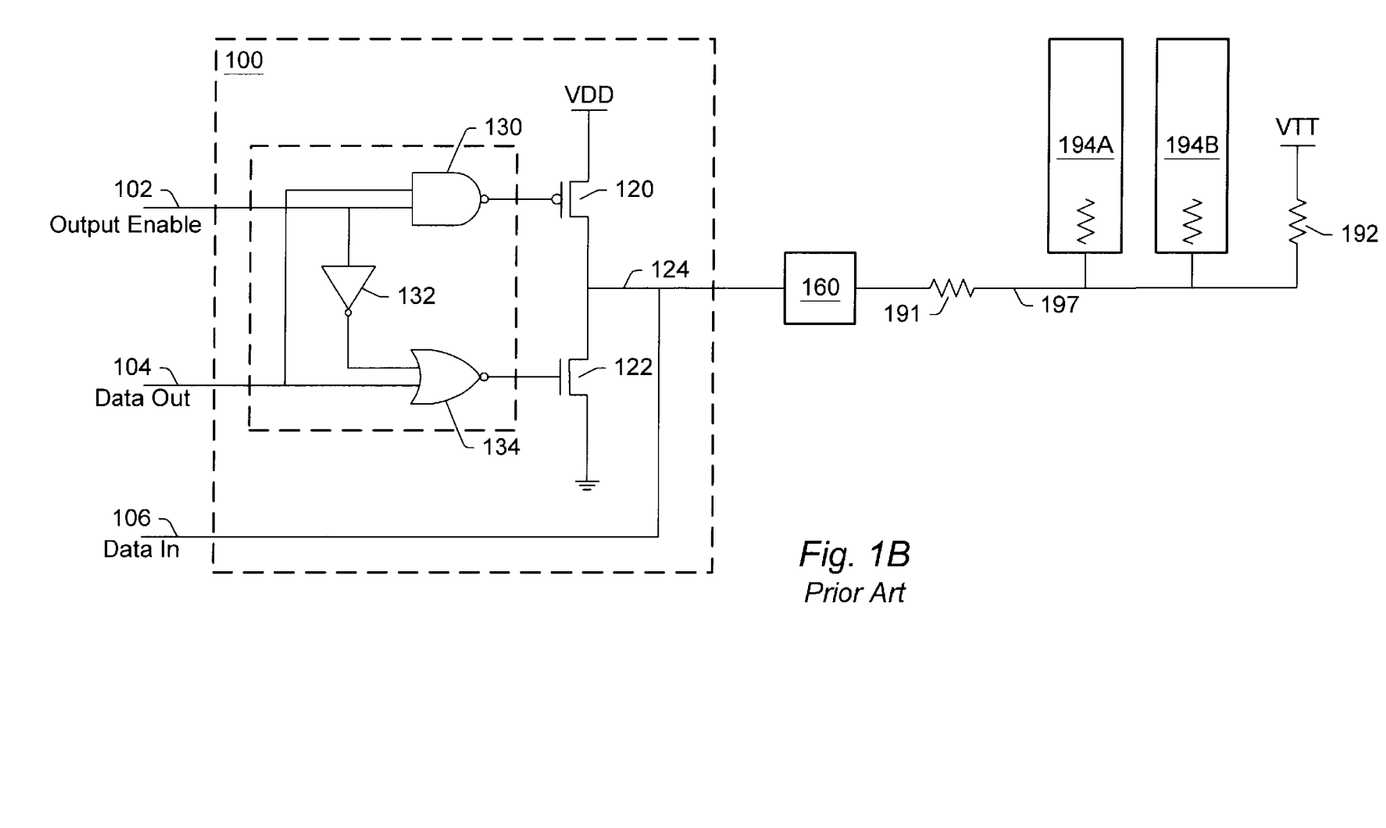
FIG. 1B illustrates a prior art bi-directional output buffer.

FIG. 1B illustrates one example of a typical bi-directional output buffer 100. In the example shown, buffer 100 is coupled to memory modules 194A–194B via bus 197. Buffer 100 is configured to receive output enable 102, data out 104, and data in 106. Included in buffer 100 are nand gate 130, inverter 132, and nor gate 134. As is apparent from the figure, transistor 120 is turned on when both the output enable 102 and data out 104 are asserted, and the output signal 124 is driven via I/O pad 160. If both the output enable 102 and data out 104 are low, then transistor 122 is turned on and a corresponding signal 124 driven out via I/O pad 160. Bus 197 includes termination resistors 191 and 192.

Buffer 100 is configured to both drive and receive signals. For example, buffer 100 may both write to, and receive data from, memory modules 194. Generally speaking, output enable 102 will be negated when receiving data via I/O pad 160. When output enable 102 is negated, both transistors 120 and 122 are turned off. Each of memory modules 194 include a particular output impedance. In general, the output impedance of buffer 100 may not be equal to that of memory modules 194. Consequently, utilizing series resistor 191 to create an output impedance for buffer 100 which matches the characteristic impedance of bus 197 may be appropriate for when buffer 100 is driving, but may not be an appropriate value for when modules 194 are driving and buffer 100 is receiving.

What is desired is a bi-directional buffer with improved performance characteristics.

SUMMARY OF THE INVENTION

A bi-directional output buffer is contemplated which includes active termination. The buffer has at least two operating modes, including a driving mode and a receiving mode. A high impedance mode may also be included. When operating in driving mode, the buffer is configured to have an output impedance of a specified strength. When operating in a receiving mode, the buffer is configured to another specified impedance as an active termination. In addition to providing for differing driving and receiving impedances, the buffer may also be configured such that resistive components are shared between the driving and receiving modes.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
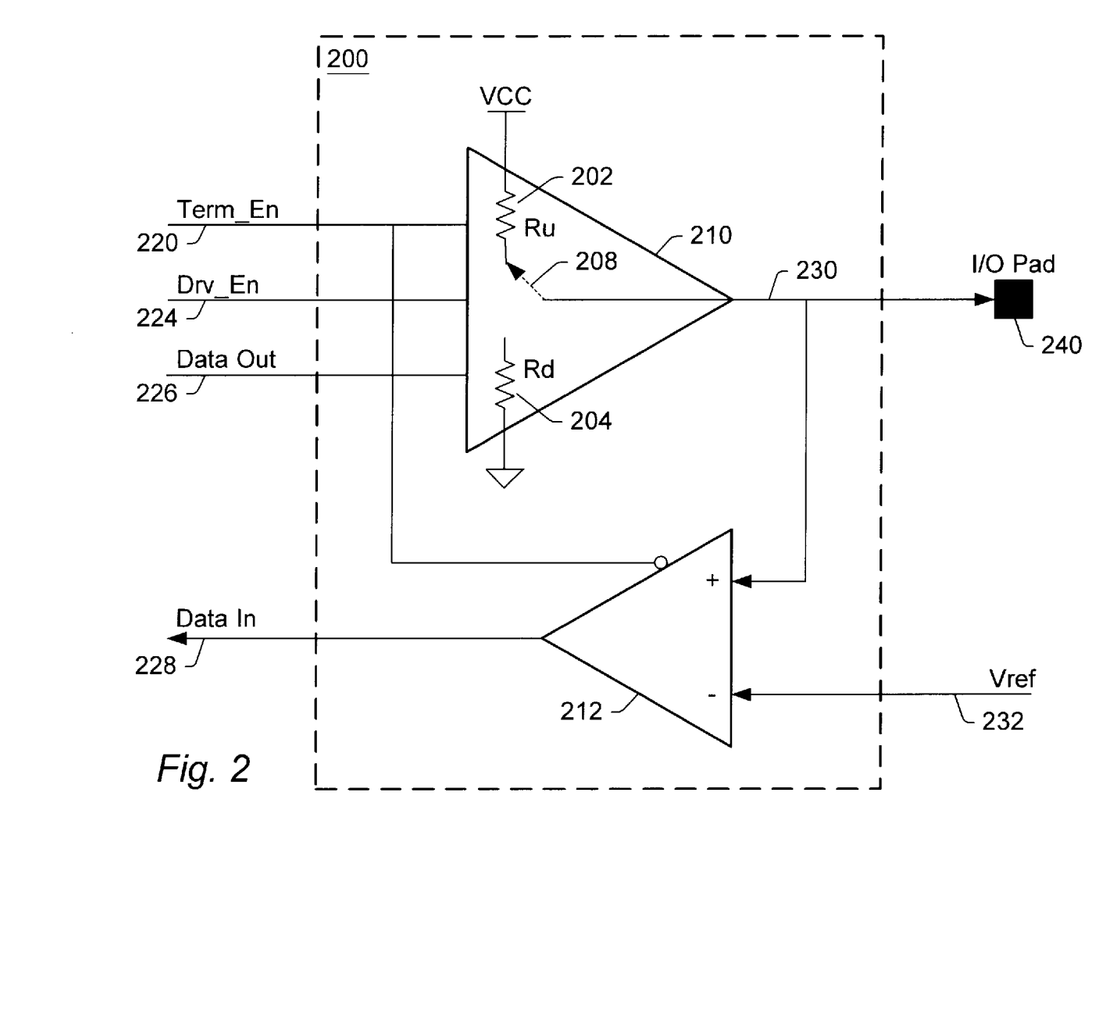
FIG. 2 is a block diagram of one embodiment of a bi-directional buffer.

Turning now to FIG. 2, a block diagram of one embodiment of a bi-directional buffer 200 is shown. Buffer 200 includes a driver 210 and receiver 212. Buffer 200 is configured to receive Term__En signal 220, Drv__En signal 224, and Data Out signal 226. Driver 210 includes resistive elements 202 and 204. Element 202 is coupled to VCC and element 204 is coupled to ground. Also included in driver 210 is switch 208 which is configured to alternately couple element 202 or element 204 to output signal 230. Buffer 200 is also configured to receive signals via I/O pad 240 which are conveyed to comparator 212. Comparator 212 is also coupled to Term_En signal 220.

Generally speaking, in the embodiment shown, buffer 200 is configured to operate in at least two modes—driving and receiving. In addition, buffer 200 may be configured to operate in a third, high impedance, mode. Term_En signal 220 is configured to operate as a termination enable signal. When active, Term_En configures buffer 200 to provide termination in receiving mode. Drv_En 224 is configured to act as a driver enable signal. Data Out 226 provides data to buffer 220 which is to be driven. As can be seen from the example of FIG. 2, Term_En 220 is also coupled to comparator 212 via inverted enable input. Consequently, when Term_En 220 is active, driver 210 is configured to provide receive termination and comparator 212 is configured to receive data via I/O pad 240, which is then conveyed as Data In 228.

As mentioned above, buffer 200 is configured to provide active termination when in receiving mode. The active termination impedance provided by buffer 200 may be different than the output impedance of buffer 200. Still further, as will be discussed below, buffer 200 is configured to reduce the number of components required by sharing components between both driving and receiving modes.

Figure 3:
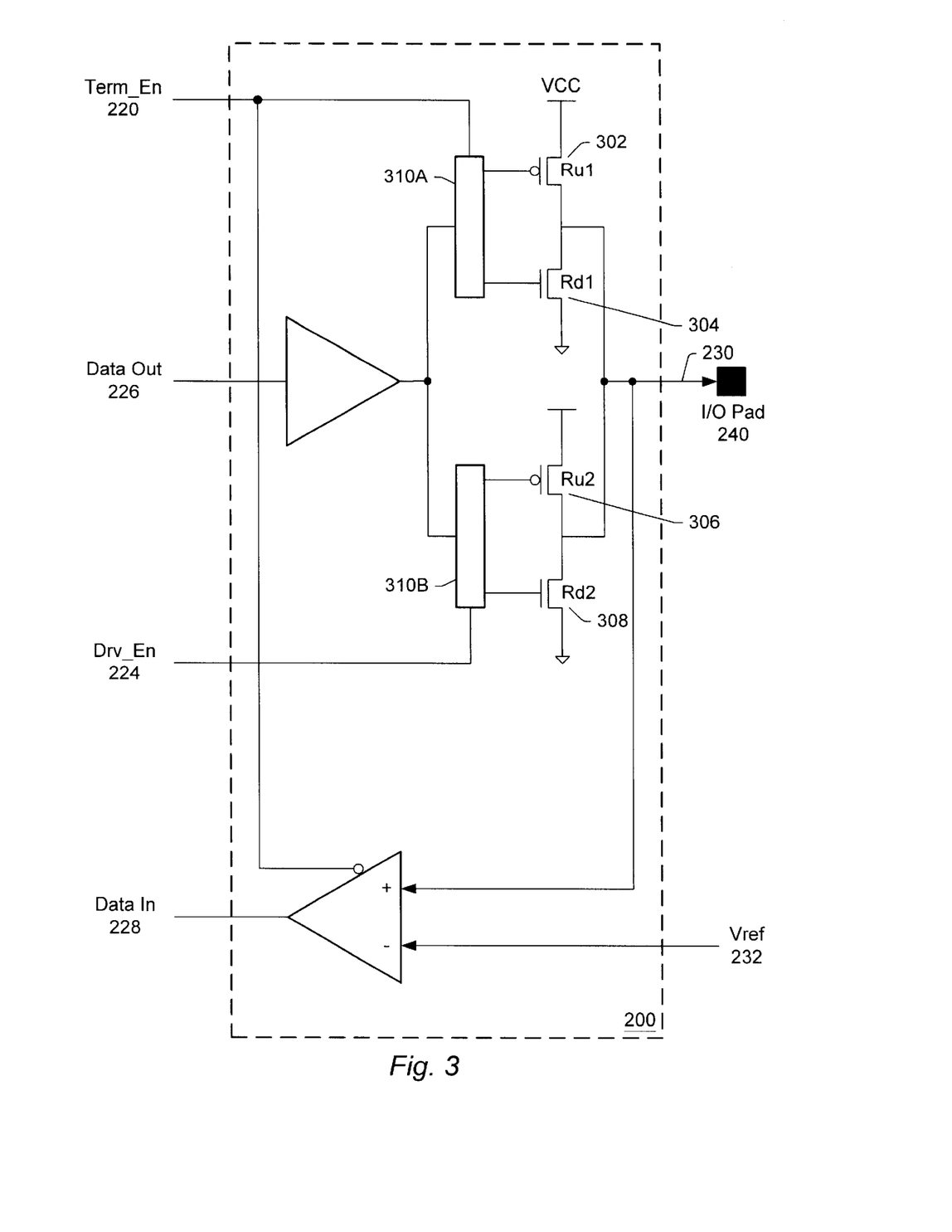
FIG. 3 is a diagram of one embodiment of a bi-directional buffer.

FIG. 3 illustrates one embodiment of buffer 200. In the embodiment of FIG. 3, buffer 200 includes p-channel transistors Ru1 302 and Ru2 306, and n-channel transistors Rd1 304 and Rd2 308. Also included is circuitry 310A which is coupled to Term_En 220, Data Out 226, Ru1 302 gate, and Rd1 304 gate. Circuit 310B is coupled to Data Out 226, Drv_En 224, Ru2 306 gate, and Rd2 308 gate. Circuits 310 are configured to apply selected values to the gates of transistors 302–308 in order to either turn on or off each transistor. Term-En 220 is also coupled to receive circuitry 229 via inverted input.

Figure 4:
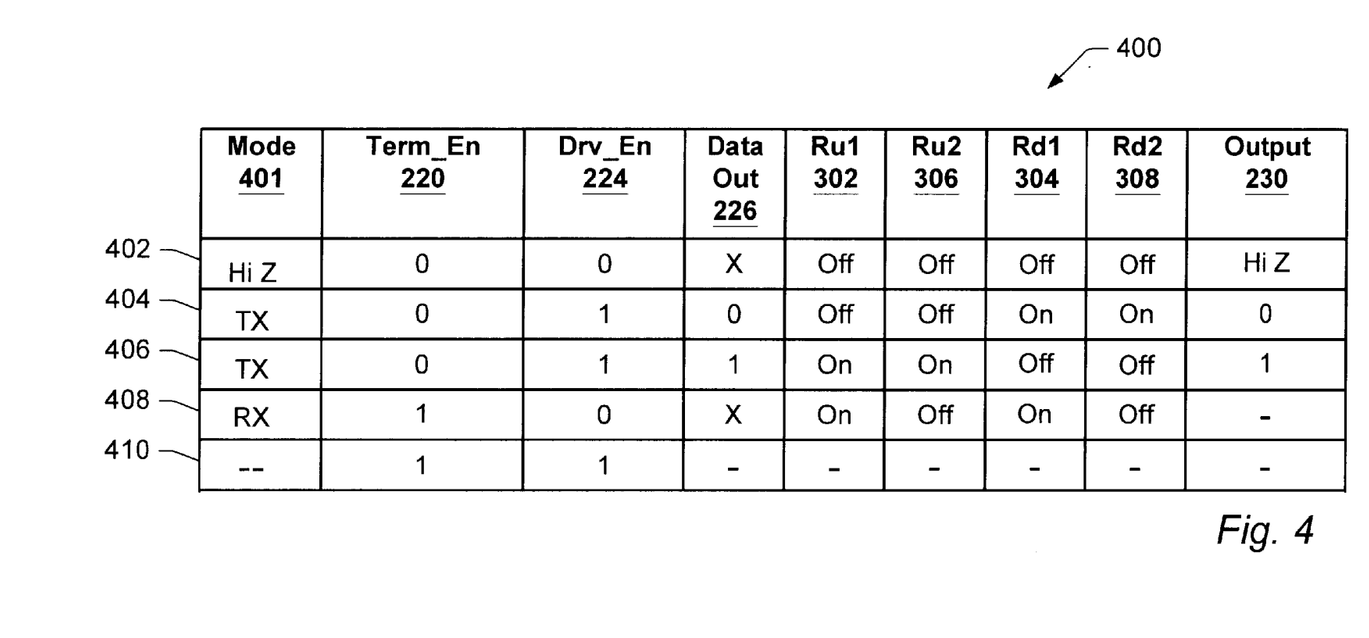
FIG. 4 is a table describing one embodiment of the operation of the buffer in FIG. 3.

Referring to FIG. 4, a table 400 is shown which describes the operation of the embodiment of buffer 200 shown in FIG. 3. Table 400 includes nine columns and six rows. Column 401 indicates a mode of operation of buffer 200, which each of the remaining columns of table 400 indicate the value of a particular signal or component of buffer 200. Four modes of operation are described by each of rows 402–408. In one embodiment, a mode of operation wherein Term_En 220 is asserted and Drv_En 224 is also asserted is not permitted, or undefined.

A first mode of operation, Hi Z, is described in row 402. When Term_En 220 and Drv_En 224 are both negated, circuits 310 are configured to turn off all transistors 302–310, and place output signal 230 in a high impedance state. In a second mode of operation, buffer 200 is configured to drive, or transmit (TX), a logic high signal. In response to detecting Term_En 220 is low and Drv_En 224 is high, buffer 200 is configured to drive the value of Data Out 226 as output signal 230. When driving and Data Out 226 is low, a binary "0" in this example, circuits 310 are configured to turn off transistors Ru1 302 and Ru2 306, and turn on transistors Rd1 304 and Rd2 308. On the other hand, when driving and Data Out 226 is high, circuits 310 are configured to turn on transistors Ru1 302 and Ru2 306, while turning off transistors Rd1 304 and Rd2 308. Finally, when Term_En 220 is asserted and Drv_En 224 is negated, buffer 200 is configured to operate in receiving (RX) mode 408. When in receiving mode 408, circuits 310 are configured to turn on transistors Ru1 302 and Rd1 306, while turning off transistors Ru2 306 and Rd2 308.

In one embodiment, transistors Ru1 302 and Rd1 304 are weaker than transistors Ru2 306 and Rd2 308, respectively. As described above, when buffer 200 is driving both a strong transistor and a weak transistor will be on. This combination of strong and weak transistor has a particular driving impedance. In contrast, when buffer 200 is in receiving mode, weaker transistors Ru1 302 and Rd1 304 are turned on and provide an active receiving termination. In addition, transistors Ru1 302 and Rd1 304 are weak relative to those transistors which are on when driving. Consequently, the active termination provided by transistors Ru1 302 and Rd1 304 may have a lower impedance than the driving impedance. In this manner, improved impedance matching may be obtained for both driving and receiving modes in a single buffer. Further, by sharing resistive elements, transistors in this case, between driving and receiving modes, fewer elements may be required in the construction of buffer 200.

Figure 5:
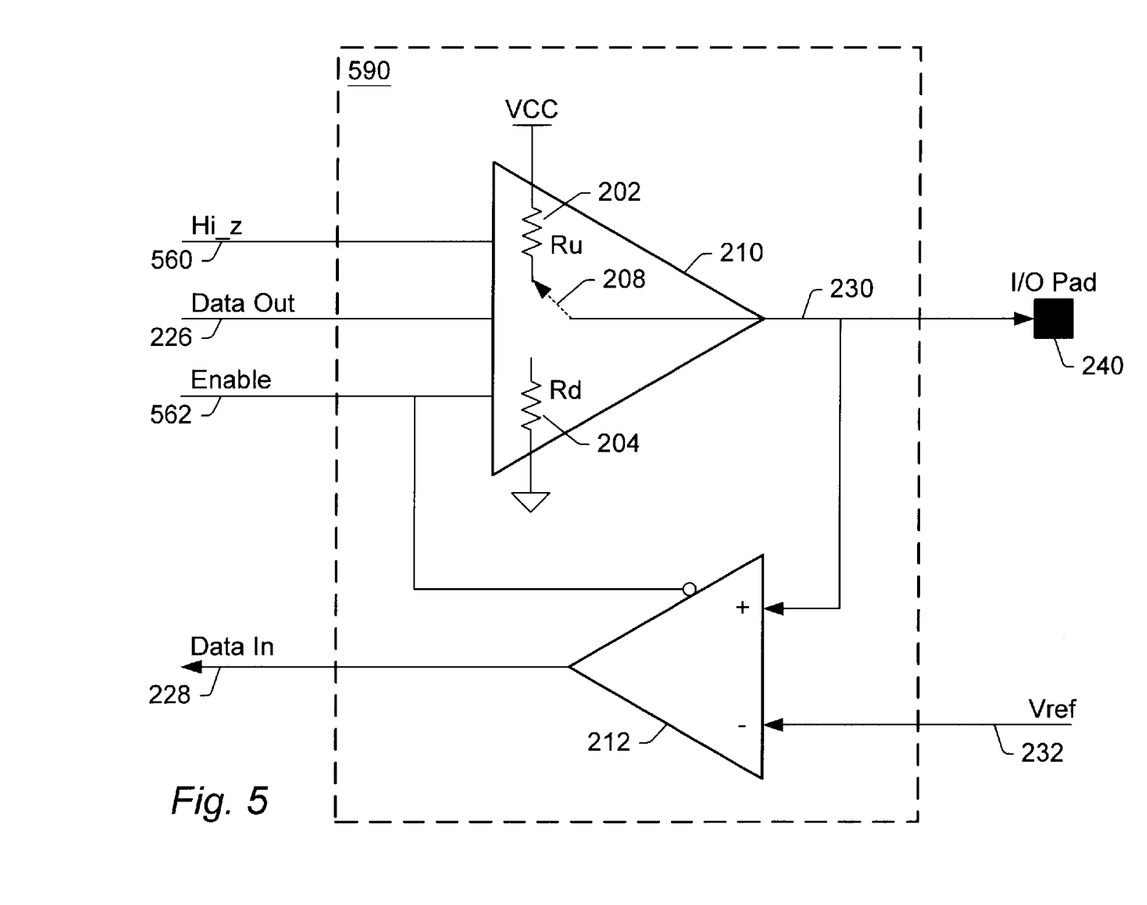
FIG. 5 is a block diagram of one embodiment of a bi-directional buffer.

Turning now to FIG. 5, a block diagram of an alternative embodiment of a bi-directional buffer 590 is shown. The buffer 590 of FIG. 5 is similar to the buffer 200 of FIG. 2, with the exception of particular signals input to buffer 590. For example, buffer 590 does not include the Term_En signal 220 and Drv_En signal 224 of buffer 200. Rather, buffer 590 includes a Hi-z signal 560 and Enable signal 562.

Figure 6:
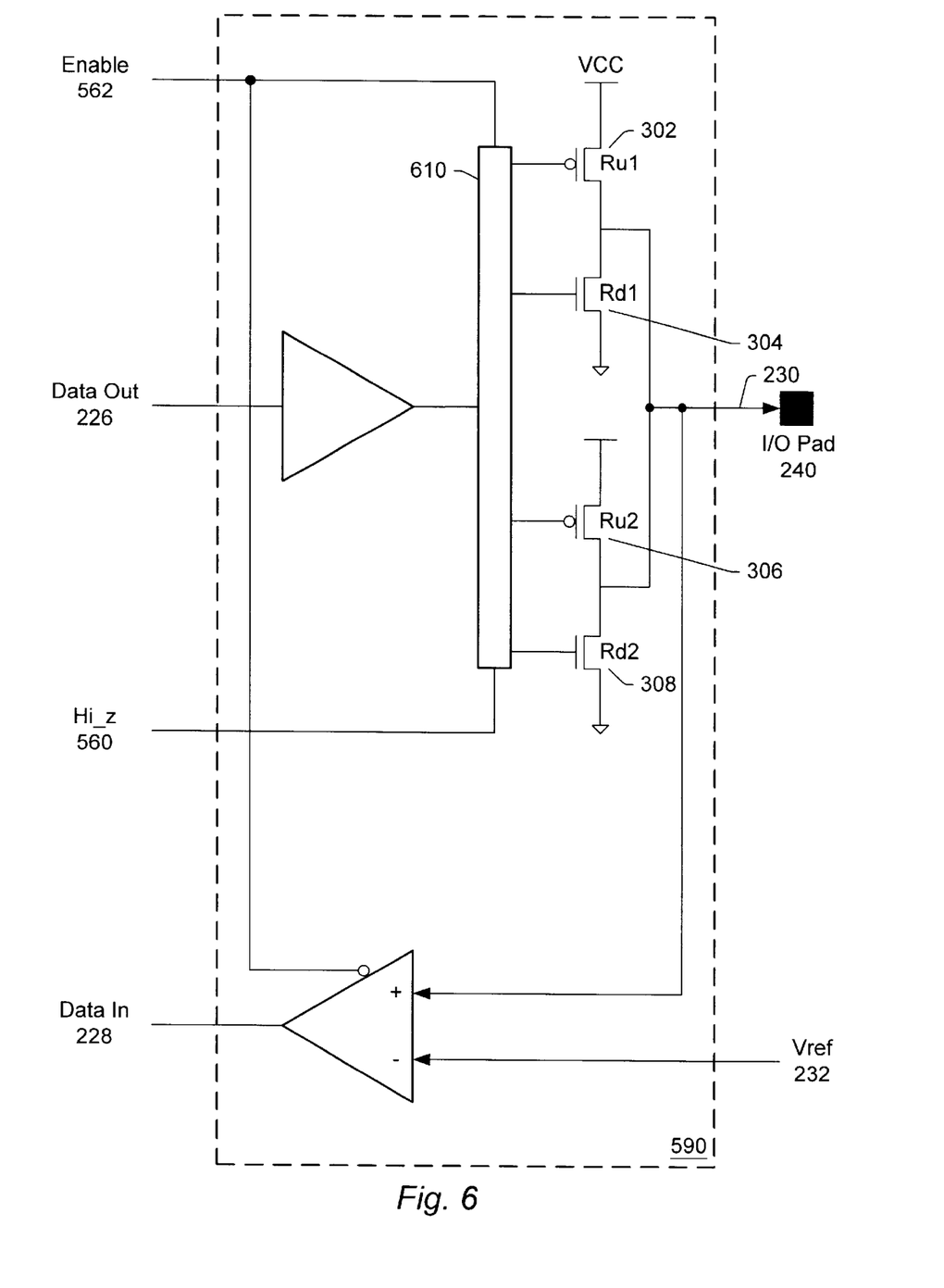
FIG. 6 is a diagram of one embodiment of a bi-directional buffer.
Figure 7:
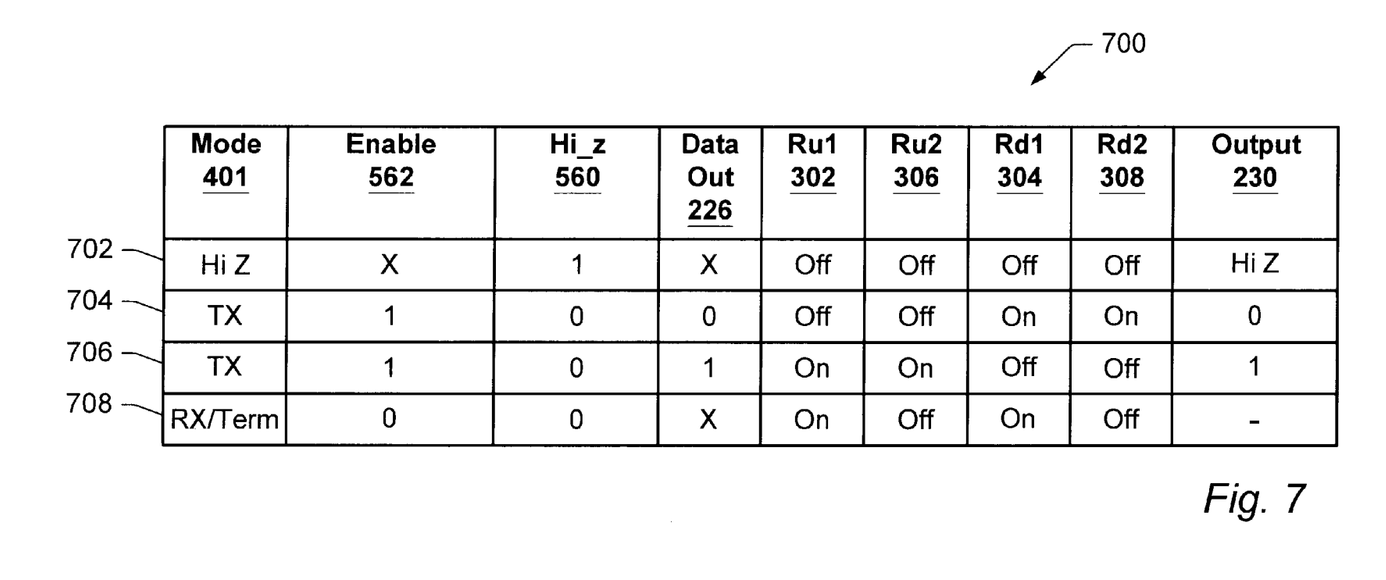
FIG. 7 is a table describing one embodiment of the operation of the buffer in FIG. 3.

FIG. 6 illustrates one embodiment of buffer 590. Enable signal 562 is coupled to circuitry 610 and receive circuitry 229. Hi-z signal 560 is coupled to circuitry 610. Operation of buffer 590 is illustrated by table 700 of FIG. 7. Rows 702–708 describe various modes of operation of buffer 590. In a first mode 702 of operation, Hi_z signal 562 is asserted, transistors 302, 304, 306, and 308 are turned off, and output 230 is placed in a Hi-z state. In a second mode 704 of operation, buffer 590 is configured to transmit a logic low signal (Data Out 226 is low). In this mode of operation, Enable signal 560 is asserted, Hi-z 562 is negated, transistors 302 and 306 are off, and transistors 304 and 308 are turned on. A logic low signal is then driven on Output 230. When driving a logic high signal (Data Out 226 is high), Enable 560 is asserted, Hi_z 562 is negated, transistors 302 and 306 are turned on, and transistors 304 and 308 are turned off. Finally, when operating in a receiving/termination mode 708, both Enable 560 and Hi_z 562 are negated, transistors 302 and 304 are turned on, and transistors 306 and 308 are turned off.

Figure 8:
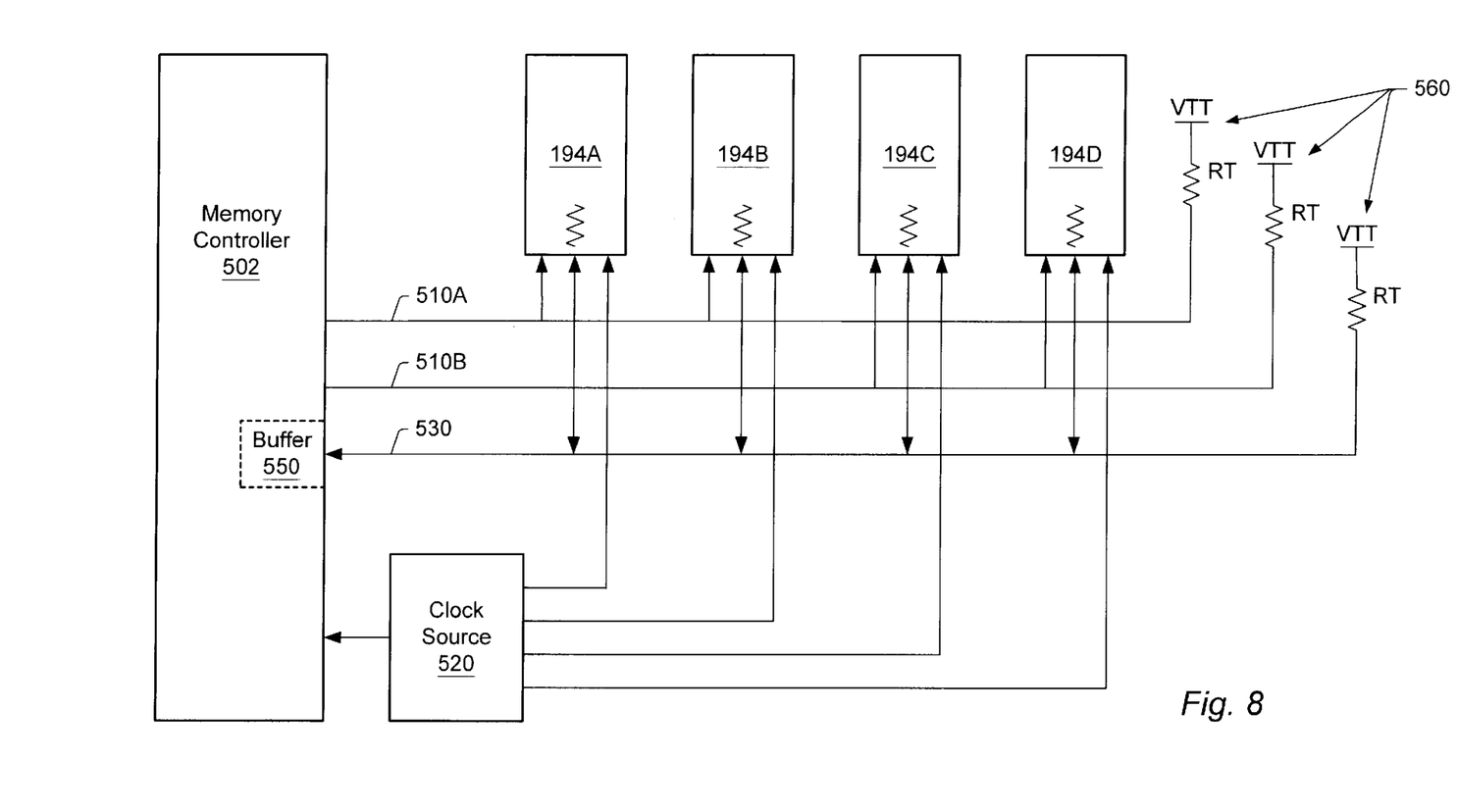
FIG. 8 illustrates on embodiment of a system including a bi-directional buffer.

FIG. 8 illustrates one embodiment of a system 500 incorporating a bi-directional buffer as described above. FIG. 8 includes a memory controller 502 coupled to memory modules 194A–194D and clock source 520. Controller 502 is coupled to memory modules 194A and 194B via command/address bus 510A. Controller 502 is coupled to memory modules 194C and 194D via command/address bus 510B. In addition, controller 502 includes bi-directional buffer 550 which is coupled to each of memory modules 194 via data bus 530. Each of buses 510 and 530 are terminated 560 with resistors RT. Finally, clock source 520 is also coupled to each of memory modules 194.

In one embodiment, system 500 is a synchronous DRAM (SDRAM) system. However, numerous other possible memory configurations and applications are possible and are contemplated. In a manner as described above, buffer 550 is configured to both drive and receive data via data bus 530. When driving, buffer 550 sees a particular load impedance and may be configured to provide a matching impedance to improve signal integrity. However, as already noted, when receiving, the impedance with which buffer 550 is configured for driving may not be appropriate for receiving. Consequently, buffer 550 is configured to provide active termination with a different impedance than the driving impedance. Because buffer 550 is configured to provide active termination, no series resistor is needed on bus 530. By eliminating the need for the series resistor, passive components (such as series resistors) on the printed circuit board (PCB) may be reduced and more routing channels between the controller 502 and the memory modules 194 may be realized. Still further, buffer 550 may be configured to share components in providing both the driving and receiving impedances which may reduce the size and/or component count of buffer 550.

While the present invention has been described with reference to particular embodiments, it will be understood that the embodiments are illustrative and that the invention scope is not limited to these embodiments. For example, while CMOS components are used in the above illustrations, other components and switching mechanisms may be utilized as well. In addition, it will be recognized that alternative embodiments may utilize alternate logic states to assert or negate signals. Many variations, modifications, additions and improvements to the embodiments described are possible. These variations, modifications, additions and improvements may fall within the scope of the invention as detailed within the following claims.

What is claimed is:

1. A bi-directional buffer comprising:
   a driver component;
   a receiver component; and
   circuitry configured to:
      select a driving mode of operation in response to detecting a first condition, wherein said driving mode comprises a first impedance; and
      select a receiving mode of operation in response to detecting a second condition, wherein said receiving mode provides active termination;
      wherein said active termination comprises a second impedance which is different than said first impedance.

2. The buffer of claim 1, wherein said driver component comprises four transistors including a first transistor, a second transistor, a third transistor, and a fourth transistor, and wherein said active termination comprises at least two of said transistors.

3. The buffer of claim 2, wherein said circuitry is configured to turn on said first and third transistors, and turn off said second and fourth transistors, in response to detecting said driving mode and detecting a data with a high logic value is being driven.

4. The buffer of claim 2, wherein said circuitry is configured to turn on said second and fourth transistors, and turn off said first and third transistors, in response to detecting said driving mode and detecting a data with a low logic value is being driven.

5. The buffer of claim 2, wherein said circuitry is configured to turn on said first and second transistors, and turn off said third and fourth transistors, in response to detecting said receiving mode.

6. The buffer of claim 1, wherein detecting said first condition comprises detecting the assertion of a drive enable signal, and wherein detecting said second condition comprises detecting the assertion of a termination enable signal.

7. The buffer of claim 1, wherein said circuitry is further configured to provide a high impedance mode of operation.

8. A system comprising:
   a data bus;
   a storage device coupled to said data bus; and
   a memory controller including a buffer coupled to said data bus, wherein said buffer is configured to:
      drive data onto said data bus in response to detecting a first mode of operation, wherein said first mode comprises a first impedance; and
      receive data via said data bus in response to detecting a second mode of operation, wherein said second mode provides active termination with a second impedance which is different than said first impedance.

9. The system of claim 8, wherein said buffer comprises four transistors including a first transistor, a second transistor, a third transistor, and a fourth transistor, and wherein said active termination comprises at least two of said transistors.

10. The system of claim 9, wherein said buffer is configured to turn on said first and third transistors, and turn off said second and fourth transistors, in response to detecting said first mode of operation and detecting a data with a high logic value is being driven.

11. The system of claim 10, wherein said buffer is configured to turn on said second and fourth transistors, and turn off said first and third transistors, in response to detecting said first mode of operation and detecting a data with a low logic value is being driven.

12. The system of claim 11, wherein said buffer is configured to turn on said first and second transistors, and turn off said third and fourth transistors, in response to detecting said receiving mode.

13. The system of claim 8, wherein detecting said first mode of operation comprises detecting the assertion of a drive enable signal, and wherein detecting said second mode of operation comprises detecting the assertion of a termination enable signal.

14. The system of claim 8, wherein said buffer is further configured to provide a high impedance mode of operation.

15. The system of claim 8, wherein said data bus comprises an impedance substantially equivalent to said first impedance.

16. A method of bi-directional communication comprising:
   selecting a driving mode of operation in response to detecting a first condition, wherein said driving mode comprises a first impedance;
   selecting a receiving mode of operation in response to detecting a second condition, wherein said receiving mode comprises an active termination with a second impedance which is different than said first impedance.

17. The method of claim 16, wherein said first and second impedance comprise shared components.

* * * * *